US012757911B2

(12) United States Patent
Kim et al.

(10) Patent No.: US 12,757,911 B2
(45) Date of Patent: Oct. 13, 2026

(54) METHOD FOR PRODUCING FERMENTED COFFEE CULTURED WITH GRAIN SOLID-TYPE MUSHROOM MYCELIUM SEEDS

(71) Applicant: DOLSAN MUSHROOM FARMING ASSOCIATION, Yeosu-si (KR)

(72) Inventors: Sang Yong Kim, Yeosu-si (KR); Hoon Hee Kim, Gimje-si (KR); Kwang Joon Choi, Yongin-si (KR); Mun Chang Cho, Gimje-si (KR)

(73) Assignee: DOLSAN MUSHROOM FARMING ASSOCIATION, Yeosu-si (KR)

(*) Notice: Subject to any disclaimer, the term of this patent is extended or adjusted under 35 U.S.C. 154(b) by 230 days.

(21) Appl. No.: 18/690,122

(22) PCT Filed: Aug. 26, 2022

(86) PCT No.: PCT/KR2022/012833
§ 371 (c)(1),
(2) Date: Mar. 7, 2024

(87) PCT Pub. No.: WO2023/068529
PCT Pub. Date: Apr. 27, 2023

(65) Prior Publication Data

US 2024/0373872 A1 Nov. 14, 2024

(30) Foreign Application Priority Data

Oct. 19, 2021 (KR) ........................ 10-2021-0139598

(51) Int. Cl.
*A23F 5/02* (2006.01)
*A23F 5/16* (2006.01)

(52) U.S. Cl.
CPC . *A23F 5/02* (2013.01); *A23F 5/16* (2013.01)

(58) Field of Classification Search
CPC ...... A23F 5/02; A23F 5/04; A23F 5/16; A23F 5/24; A23F 5/28; A23F 5/36
See application file for complete search history.

(56) References Cited

U.S. PATENT DOCUMENTS

2016/0120201 A9* 5/2016 Kelly ........................ A23F 5/02 426/595

FOREIGN PATENT DOCUMENTS

| | | |
|---|---|---|
| JP | 2010-017126 A | 1/2010 |
| KR | 10-2003-0071740 A | 9/2003 |
| KR | 10-2010-0066795 A | 6/2010 |
| KR | 10-2013-0016914 A | 2/2013 |

(Continued)

OTHER PUBLICATIONS

Lee et al., "Characteristics and suitability of various cereal grains in spawn production of button mushroom," Journal of Mushrooms. 12(4):237-243; Dec. 2014. http://dx.doi.org/10.14480/JM.2014.12.4.237 (Year: 2014).*

*Primary Examiner* — Nikki H. Dees
*Assistant Examiner* — Maura E. Sweeney
(74) *Attorney, Agent, or Firm* — You & IP, LLC

(57) ABSTRACT

A method for producing fermented green coffee beans comprises immersing green coffee beans in an extract of *Tetragonia tetragonioides* and *Rumex crispus* at 18-22° C. for several hours; sterilizing and cooling the beans; applying grain solid spawn and culturing the beans at 18-22° C. for several days to obtain fermented green coffee beans; and drying the fermented beans to a moisture content of 10-13%.

4 Claims, 1 Drawing Sheet

(56) References Cited

FOREIGN PATENT DOCUMENTS

| | | | | | | |
|---|---|---|---|---|---|---|
| KR | 20160081762 | A | * | 7/2016 | ............... | A23F 5/02 |
| KR | 10-1853416 | B1 | | 4/2018 | | |
| KR | 10-1894295 | B1 | | 9/2018 | | |
| KR | 10-2021-0101506 | A | | 8/2021 | | |

* cited by examiner

METHOD FOR PRODUCING FERMENTED COFFEE CULTURED WITH GRAIN SOLID-TYPE MUSHROOM MYCELIUM SEEDS

TECHNICAL FIELD

The present invention relates to a method for producing fermented coffee, comprising applying grain solid-type seeds to sterilized green coffee beans and culturing same; and separating the grain solid-type seeds from the fermented product of the cultured green coffee beans, followed by drying, and fermented coffee produced by the method.

BACKGROUND ART

Coffee belongs to the Coffee genus of the Rubiaceae family, and its commercially grown varieties are largely divided into three types: *Arabica, Robusta-canephora* and *Liberica*. Coffee is a representative beverage made to harmonize bitterness, astringency, sourness and sweetness, and is the most widely consumed food in the world. In Korea, the coffee market is continuously growing with the proliferation of coffee shops and increased self-consumption. It is known that coffee has a high content of antioxidants such as polyphenols, as compared to other foods and, thus, has a high ability to scavenge free radicals that cause cell damage. Recently, it has been reported that the content of lipophilic antioxidants and chlorogenic acid, which have a protective effect on nerve cells, is higher in roasted coffee beans than in green coffee beans. In addition, coffee is known to have excellent protective effects against Alzheimer's disease, Parkinson's disease, type 2 diabetes, cholesterol, heart disease and liver cirrhosis. As a result, beyond coffee being considered a favorite food, much research is being conducted on its pharmacological effects.

Fermented foods are foods made using the fermentation action of microorganisms such as lactic acid bacteria and yeast and its type may vary depending on the type of microorganism and the ingredients of food. A fermented food has a unique characteristic and flavor depending on the type. The functionality of food ingredients can be improved through fermentation.

The existing technology inoculates sterilized green coffee beans with mushroom mycelium cultured in liquid seeds by spraying liquid on them such that the contamination rate is high due to overhumidification and the entire product is not cultured evenly, resulting in low production yield. Since the coffee has a black charcoal appearance, its sensuality is reduced, and its unique off-flavor inhibits the rich and diverse taste and aroma of the coffee, significantly lowering productivity and quality competitiveness.

Korean Laid-open Patent Publication No. 2021-0101506 discloses a method for producing fermented coffee using yeast that does not require a coffee aging process, and Korean Patent No. 10-1894295 discloses a method for processing coffee using a fermented plum extract. However, these methods are different from the method for producing fermented coffee cultured with the grain solid-type mushroom mycelium seeds of the present invention.

SUMMARY OF INVENTION

Technical Problem

The present invention was created in response to the above-described needs and aims to provide a method for producing fermented coffee with useful pharmacological properties and excellent preference by optimizing the pretreatment, sterilization and fermentation of green coffee beans to reduce the unique bitterness of coffee while improving functionality and flavor.

Solution to Problem

In order to solve the above-described problems, the present invention provides a method for producing fermented coffee comprising (1) adding *Tetragonia tetragonioides* and *Rumex crispus* to water, followed by extraction and filtration, to prepare an extract; (2) immersing green coffee beans in the extract prepared in step (1); (3) laying ivy leaves on the tray of a sterilizer and placing the coffee beans immersed in step (2) on the ivy leaves, followed by sterilization and cooling; (4) applying grain solid-type seeds to the green coffee beans cooled in step (3), followed by culturing; and (5) separating the grain solid-type seeds from the fermented coffee beans cultured in step (4), followed by drying.

In addition, the present invention provides fermented coffee produced by the method.

Advantageous Effects of Invention

The method for producing fermented coffee of the present invention has the advantage of low contamination rate and high production yield by culturing sterilized green coffee beans with grain solid-type seeds. In addition, it can provide high-quality fermented coffee by enriching the flavor and taste of coffee and improving functionality.

BRIEF DESCRIPTION OF DRAWINGS

FIG. 1 is a photograph showing the seeds separated after culturing green coffee beans with solid-type grain seeds.

MODE FOR INVENTION

In order to achieve the object of the present invention, the present invention provides a method for producing fermented coffee comprising (1) adding *Tetragonia tetragonioides* and https://keyserver.lucidcentral.org/weeds/data/media/Html/rumex_crispus.htm *Rumex crispus* to water, followed by extraction and filtration, to prepare an extract;
(2) immersing green coffee beans in the extract prepared in step (1);
(3) laying ivy leaves on the tray of a sterilizer and placing the coffee beans immersed in step (2) on the ivy leaves, followed by sterilization and cooling;
(4) applying grain solid-type seeds to the green coffee beans cooled in step (3), followed by culturing; and
(5) separating the grain solid-type seeds from the fermented coffee beans cultured in step (4), followed by drying.

In the method for producing fermented coffee of the present invention, the extract in step (1) may be prepared, preferably by adding 4.5 to 5.5 g of *Tetragonia tetragonioides* and 4.5 to 5.5 g of https://keyserver.lucidcentral.org/weeds/data/media/Html/rumex_crispus.htm *Rumex crispus* to 180 to 220 mL of water, followed by extraction at 90 to 110° C. for 2 to 4 hours and filtration, and more preferably by adding 5 g of *Tetragonia tetragonioides* and 5 g of https://keyserver.lucidcentral.org/weeds/data/media/Html/rumex_crispus.htm *Rumex crispus* to 200 ml of water, followed by extraction at 100° C. for 3 hours and filtration.

In addition, in the method for producing fermented coffee of the present invention, the immersion in step (2) may be carried out preferably by immersing green coffee beans in the extract at 18 to 22° C. for 5 to 10 hours, and more preferably by immersing green coffee beans in the extract at 20° C. for 8 hours.

In addition, in the method for producing fermented coffee of the present invention, the sterilization in step (3) may be carried out preferably by laying ivy leaves on the tray of a sterilizer and placing coffee beans on the ivy leaves, followed by sterilization at 110 to 130° C. for 50 to 70 minutes and cooling, and more preferably by laying ivy leaves on the tray of a sterilizer and placing coffee beans on the ivy leaves, followed by sterilization at 121° C. for 60 minutes and cooling.

In order to ferment green coffee beans, green coffee beans should be immersed and sterilized as described above, which has the advantage of supplying moisture to the green beans, causing them to swell and softening the tissue, allowing for good culture.

In addition, in the method for producing fermented coffee of the present invention, step (4) may be carried out preferably by applying grain solid-type seeds to the cooled green coffee beans, followed by culturing at 18 to 22° C. for 20 to 25 days. Culturing green coffee beans under the above-described conditions increased the content of ingredients useful to a human body contained in coffee, improved the taste and flavor of coffee, and reduced the bitter taste of coffee. However, the conditions for culturing outside the above-described range was not preferred because the effect of the culture was minimal or an off-flavor occurred due to overfermentation.

The grain solid-type seeds are made preferably by inoculating mushroom mycelium into grains that were immersed in water and sterilized, followed by culturing.

The mushroom mycelium may be one or more selected from the group consisting of: Shiitake, *Phellinus linteus, Ganoderma lucidum, Poria cocos, Agaricus, Hericium erinaceus, Cordyceps, Trametes versicolor, Polyporus umbellatus*, Oyster mushroom, Enoki mushroom, King oyster mushroom, *Sparassis crispa*, Maitake mushroom, Chaga mushroom, *Fomitella fraxinea*, Wood ear mushroom, *Agrocybe aegerita*, Matsutake, and Truffle, but the present invention is not limited thereto.

In addition, the grain may be one or more selected from the group consisting of brown rice, white rice, black rice, red rice, green rice, red rice, barley, black barley, oats, wheat, sorghum, corn, beans, rye, mung beans, *coix* radish, foxtail millet, millet, red beans and buckwheat, but the present invention is not limited thereto.

In addition, in the method for producing fermented coffee of the present invention, step (5) may be carried out preferably by separating the grain solid-type seeds from the fermented product of the cultured green coffee beans, followed by drying such that the moisture content is 10 to 13% (v/w). It is preferred to dry green coffee beans under the conditions in order to prevent additional fermentation thereof.

The method for producing fermented coffee of the present invention may, more specifically, comprise the steps of:

(1) adding 4.5 to 5.5 g of *Tetragonia tetragonioides* and 4.5 to 5.5 g of https://keyserver.lucidcentral.org/weeds/data/media/Html/rumex_crispus.htm *Rumex crispus* to 180 to 220 mL of water, followed by extraction at 90 to 110° C. for 2 to 4 hours and filtration, to prepare an extract;

(2) immersing green coffee beans in the extract at 18 to 22° C. for 5 to 10 hours;

(3) laying ivy leaves on the tray of a sterilizer and placing coffee beans on the ivy leaves, followed by sterilization at 110 to 130° C. for 50 to 70 minutes and cooling;

(4) applying grain solid-type seeds to the cooled green coffee beans, followed by culturing at 18 to 22° C. for 20 to 25 days; and (5) separating the grain solid-type seeds from the fermented product of the cultured green coffee beans, followed by drying such that the moisture content is 10 to 13% (v/w).

The method may, further more specifically, comprise the steps of:

(1) adding 5 g of *Tetragonia tetragonioides* and 5 g of https://keyserver.lucidcentral.org/weeds/data/media/Html/rumex_crispus.htm *Rumex crispus* to 200 ml of water, followed by extraction at 100° C. for 3 hours and filtration, to prepare an extract;

(2) immersing green coffee beans in the extract at 20° C. for 8 hours;

(3) laying ivy leaves on the tray of a sterilizer and placing coffee beans on the ivy leaves, followed by sterilization at 121° C. for 60 minutes and cooling;

(4) applying grain solid-type seeds to the cooled green coffee beans, followed by culturing at 18 to 22° C. for 20 to 25 days; and (5) separating the grain solid-type seeds from the fermented product of the cultured green coffee beans, followed by drying such that the moisture content is 10 to 13% (v/w).

The present invention also provides fermented coffee produced by the above-described method.

Hereinafter, the present invention will be described in detail by the following embodiments. However, the following embodiments are only for illustrating the present invention, and the present invention is not limited thereto.

Preparation Example 1. Fermented Coffee (1) 5 g of *Tetragonia tetragonioides* and 5 g of https://keyserver.lucidcentral.org/weeds/data/media/Html/rumex_crispus.htm *Rumex crispus* were added to 200 mL of purified water, followed by extraction at 100° C. for 3 hours and filtration, to prepare an extract.

(2) 100 g of green coffee beans were immersed in 200 mL of the extract prepared in step (1) at 20° C. for 8 hours.

(3) Ivy leaves were laid on the tray of a sterilizer, and the coffee beans immersed in step (2) were placed on the ivy leaves, followed by sterilization at 121° C. for 60 minutes and cooling to 20° C. in a cooling room.

(4) 15 mL of brown rice grain solid-type seeds were evenly applied to the top of the green coffee beans cooled in step (3), and cultured in a culture room at 18 to 22° C. for 20 to 25 days. In the culturing process, the container was shaken 10 days after inoculation to create an air gap such that the culture was evenly spread across the bottom and entire container.

The brown rice grain solid-type seeds are made by inoculating shiitake mushroom mycelium into brown rice immersed in water and sterilized, followed by culturing at 25° C. for 20 days.

(5) The brown rice grain solid-type seeds were separated from the fermented coffee beans cultured in step (4), and the fermented coffee beans were dried such that the moisture content was 10 to 13% (v/w).

Comparative Example 1. Coffee (1) 100 g of green coffee beans were immersed in 200 mL of purified water at 20° C. for 8 hours.

(2) The green coffee beans immersed in step (1) were placed on the tray of a sterilizer, followed by sterilization at 121° C. for 60 minutes and cooling to 20° C. in a cooling room.

(3) The green coffee beans cooled in step (2) were dried such that the moisture content was 10 to 13% (v/w).

Comparative Example 2. Fermented Coffee (1) 100 g of green coffee beans were immersed in 200 mL of purified water at 20° C. for 8 hours.

(2) The green coffee beans immersed in step (1) were placed on the tray of a sterilizer, followed by sterilization at 121° C. for 60 minutes and cooling to 20° C. in a cooling room.

(3) 15 mL of brown rice grain solid-type seeds were evenly applied to the top of the green coffee beans cooled in step (2), and cultured in a culture room at 18 to 22° C. for 20 to 25 days. In the culturing process, the container was shaken 10 days after inoculation to create an air gap such that the culture was evenly spread across the bottom and entire container.

The brown rice grain solid-type seeds are made by inoculating shiitake mushroom mycelium into brown rice immersed in water and sterilized, followed by culturing at 25° C. for 20 days.

(4) The brown rice grain solid-type seeds were separated from the fermented coffee beans cultured in step (3), and the fermented coffee beans were dried such that the moisture content was 10 to 13% (v/w).

Comparative Example 3. Fermented Coffee (1) 10 g of *Tetragonia tetragonioides* were added to 200 mL of purified water, followed by extraction at 100° C. for 3 hours and filtration, to prepare an extract.

(2) Fermented coffee was prepared by using the extract prepared in step (1) in the same manner as steps (2) to (5) of Preparation Example 1.

Comparative Example 4. Fermented Coffee (1) 10 g of *Rumex crispus* were added to 200 mL of purified water, followed by extraction at 100° C. for 3 hours and filtration, to prepare an extract.

(2) Fermented coffee was prepared by using the extract prepared in step (1) in the same manner as steps (2) to (5) of Preparation Example 1.

Comparative Example 5. Fermented Coffee (1) 5 g of *Tetragonia tetragonioides* and 5 g of *Rumex crispus* were added to 200 mL of purified water, followed by extraction at 100° C. for 3 hours and filtration, to prepare an extract.

(2) 100 g of green coffee beans were immersed in 200 mL of the extract prepared in step (1) at 20° C. for 8 hours.

(3) The green coffee beans immersed in step (2) above were placed on the tray of a sterilizer, followed by sterilization at 121° C. for 60 minutes and cooling to 20° C. in a cooling room.

(4) Fermented coffee was prepared by using the green coffee beans cooled in step (3) in the same manner as steps (4) to (5) of Preparation Example 1.

Example 1. Beta-Glucan Analysis

Beta-glucan in the sample was measured by using the Megazyme kit (Mushroom and Yeast β-glucan Assay Procedure K-YBGL, Megazyme, Ireland).

First, 100 mg of the ground sample obtained by filtering the total glucan through a 100 mesh sieve was placed in a tube, added with 1.5 mL of 37% HCl, and placed in a constant temperature water bath at 30° C. for 45 minutes to decompose same. Afterwards, 10 mL of distilled water was added to vortex same, and cultured at 100° C. for 2 hours. Afterwards, while being cooled at room temperature, the sample was added with 10 mL of 2N KOH, adjusted to 100 mL by using 200 mM sodium acetate buffer, and thoroughly mixed.

Afterwards, 0.1 mL of the supernatant was added with 0.1 mL of exo-1,3-β-glucanase plus β-glucosidase dissolved in 200 mM of sodium acetate buffer, 0.2 mL of acetate buffer as a reagent blank, 0.1 mL of D-glucose standard and 0.1 mL of acetate buffer, followed by mixing and culturing at 40° C. for 60 minutes. Then, 3 mL of glucose oxidase/peroxidase mixture (GOPOD) was added and cultured at 40° C. for 20 minutes, and absorbance was measured at 510 nm.

TABLE 1

| β-glucan (%) of fermented coffee | |
|---|---|
| Type of fermented coffee | β-glucan (%) |
| Preparation Example 1 | 5.6 ± 0.2 |
| Comparative Example 1 | ND (Not detected) |
| Comparative Example 1 | 2.3 ± 0.1 |

As a result, β-glucan was not detected in the coffee of Comparative Example 1, and the β-glucan content was found to be higher in the fermented coffee of Preparation Example 1, as compared to the fermented coffee of Comparative Example 2.

Example 2. DPPH Radical Scavenging Ability

To determine the antioxidant activity of each coffee, the antioxidant activity was measured by hydrogen electron donation ability. The samples were diluted with distilled water, and 900 μl of DPPH solution (100 μM) was mixed with 100 μl of each sample and stirred. The hydrogen electron donating ability was averaged by repeating each experiment three times, and the degree of decrease in absorbance relative to the control was calculated using the following equation:

$$DPPH \text{ radical scavenging ability } (\%) = (A - B)/A \times 100$$

A: Absorbance of DPPH solution without addition of sample

B: Absorbance of the sample reacted with DPPH in the reaction solution

TABLE 2

| Antioxidant activity (%) of fermented coffee | |
|---|---|
| Type of fermented coffee | DPPH radical scavenging ability (%) |
| Preparation Example 1 | 69.2 ± 1.4 |
| Comparative Example 1 | 45.3 ± 0.9 |
| Comparative Example 2 | 55.2 ± 2.1 |
| Comparative Example 3 | 61.0 ± 1.3 |
| Comparative Example 4 | 59.3 ± 1.8 |
| Comparative Example 5 | 62.8 ± 1.0 |

The results of measuring the DPPH radical scavenging ability by diluting fermented coffee are shown in Table 2 above. As a result, it was found that the fermented coffee of Preparation Example 1 had the highest DPPH radical scavenging ability.

Example 3. Sensory Test

A test on the sensory properties was conducted on 50 testers by using the coffees of Preparation Example 1 and comparative examples. The coffee extract obtained by roasting each coffee with medium roasting, grinding, and hot water extraction using hand drip was consumed by each of the testers, which was repeated 3 times, and the aroma, taste, smoothness, and overall preference were classified by using a 5-point preference scale (1 point: very bad, 4 points: bad, 3 points: average, 4 points: good, 5 points: very good), and the average was calculated.

TABLE 3

Test on the sensory properties of coffee

| Type of Coffee | Aroma | Taste | Smoothness | Overall preference |
|---|---|---|---|---|
| Preparation Example 1 | 4.5 | 4.4 | 4.2 | 4.3 |
| Comparative Example 1 | 3.3 | 3.4 | 3.5 | 3.3 |
| Comparative Example 2 | 3.8 | 3.7 | 3.8 | 3.5 |
| Comparative Example 3 | 3.9 | 3.9 | 3.9 | 3.7 |
| Comparative Example 4 | 4.0 | 4.0 | 4.0 | 3.9 |
| Comparative Example 5 | 4.1 | 3.9 | 4.0 | 3.8 |

The results of the test on the sensory properties of the extract from each coffee are shown in Table 3 above. As a result, the fermented coffee of Preparation Example 1 showed higher scores in all items, as compared to the coffees of comparative examples, and it was found that the fermented coffee of Preparation Example 1 had a high β-glucan content and excellent antioxidant activity and was suitable for consumers' tastes.

The invention claimed is:

1. A method for producing fermented coffee beans comprising:

(1) adding 4.5 to 5.5 g of *Tetragonia tetragonioides* and 4.5 to 5.5 g of *Rumex crispus* to 180 to 220 mL of water; heating the water containing the *Tetragonia tetragonioides* and the *Rumex crispus* to a temperature of 90 to 110° C. and maintaining the temperature for 2 to 4 hours; and filtering the water to remove the *Tetragonia tetragonioides* and the *Rumex crispus* to obtain an extract;

(2) immersing green coffee beans in the extract preparing in step (1) and maintaining the green coffee beans and the extract at a temperature of 18 to 22° C. for 5 to 10 hours;

(3) laying ivy leaves on a tray of a sterilizer; removing the green coffee beans from the extract; placing the green coffee beans removed from the extract on the ivy leaves; sterilizing the green coffee beans at 110 to 130° C. for 50 to 70 minutes; and then cooling the sterilized green coffee beans;

(4) applying grain solid spawn to the green coffee beans cooled in step (3), followed by culturing at 18 to 22° C. for 20 to 25 days, to obtain a fermented product of the green coffee beans; and (5) separating the grain solid spawn from the fermented product of the green coffee beans cultured in step (4), followed by drying the fermented product of the green coffee beans to obtain fermented coffee beans such that the moisture content of the fermented coffee beans is 10 to 13% w/v (weight/volume).

2. The method for producing the fermented coffee beans of claim 1, wherein the grain is one or more selected from the group consisting of brown rice, white rice, black rice, red rice, green rice, barley, black barley, oats, wheat, sorghum, corn, beans, rye, mung beans, *coix*, foxtail millet, millet, red beans and buckwheat.

3. Fermented coffee beans produced by the method of claim 1.

4. Fermented coffee beans produced by the method of claim 2.

* * * * *